UNITED STATES PATENT OFFICE.

MICHAEL J. FRANKWICH, OF BROOKLYN, NEW YORK.

COMPOSITION FOR CLEANING GLASS AND CLOTH SATURATED THEREWITH.

1,362,092. Specification of Letters Patent. Patented Dec. 14, 1920.

No Drawing. Application filed December 15, 1919. Serial No. 345,151.

*To all whom it may concern:*

Be it known that I, MICHAEL J. FRANKWICH, a citizen of the United States, residing at 1368 Putnam avenue, borough of Brooklyn, New York city, county of Kings, and State of New York, have invented a certain new and useful Improvement in Composition for Cleaning Glass and Cloth Saturated Therewith, of which the following is a specification.

My invention relates to an improvement to prevent the blurring of glass or other substances and glass cleaning and coating substances. It is particularly adapted for use where it is desired to coat glass with a thin film to prevent rain, sleet, snow, steam, water and similar elements from adhering thereto, obscuring the vision through the glass.

It is particularly useful on wind shields of automobiles, but of course may be used on any glass surface, such as store windows, show cases, windows and on eyeglasses, whether made of glass or other material.

In the preferred form of my invention, I use a material made of the following formula: 30% molasses, 10% syrup, preferably a comparatively thin syrup, 15% alcohol, preferably wood alcohol, 15% vinegar, 20% glycerin, 10% nicotin, which I combine preferably by mixing the molasses and syrup separately. Then I mix the other materials two or more together and combine them with the first mixture. If desired, the materials may be heated to facilitate the mixing.

Having combined the materials, I then apply them to the surface to be filmed. This I preferably do by taking a cloth of suitable material and thickness, preferably a cloth that has not been dyed, which I saturate with the solution and then dry. This saturated dry cloth I then preferably heat for the purpose of making it flexible and sufficiently soft for ready use. Such a cloth will carry enough of the solution to permit of repeated use a long period of time. In treating surfaces with my filming solution, I have found that the application of the film is best performed by having the surface of the glass, etc. wet or moist. This moisture on the surface facilitates the depositing thereon of a film which will readily shed water, etc.

Of course, materials having the same characteristics as those above described may be used without departing from my invention.

What I claim as new and desire to secure by Letters Patent is:

1. A composition for cleaning glass, etc. to give it a water shedding surface, composed of 30% molasses, 10% syrup, 15% vinegar, 15% alcohol, 20% glycerin and 10% nicotin.

2. As an article of manufacture, a cloth saturated with substance for the purposes set forth, composed of molasses, syrup, vinegar, alcohol, glycerin and nicotin.

In testimony whereof, I have signed my name to this specification.

MICHAEL J. FRANKWICH.